US011926032B2

(12) United States Patent
Harrington et al.

(10) Patent No.: US 11,926,032 B2
(45) Date of Patent: Mar. 12, 2024

(54) TOOL HANDLES HAVING STATIONARY AND ROTATIONAL PORTIONS

(71) Applicant: Unger Marketing International, LLC, Bridgeport, CT (US)

(72) Inventors: William Harrington, Newton, CT (US); Stephen Huda, Shelton, CT (US)

(73) Assignee: Unger Marketing International, LLC, Bridgeport, CT (US)

( * ) Notice: Subject to any disclaimer, the term of this patent is extended or adjusted under 35 U.S.C. 154(b) by 126 days.

(21) Appl. No.: 17/480,400

(22) Filed: Sep. 21, 2021

(65) Prior Publication Data

US 2022/0001528 A1 Jan. 6, 2022

Related U.S. Application Data

(63) Continuation of application No. 16/124,809, filed on Sep. 7, 2018, now abandoned, which is a (Continued)

(51) Int. Cl.
*B25G 1/10* (2006.01)
*A47L 13/22* (2006.01)
(Continued)

(52) U.S. Cl.
CPC .............. *B25G 1/102* (2013.01); *A47L 13/22* (2013.01); *B05B 12/002* (2013.01); *B25G 1/04* (2013.01); *B25G 1/06* (2013.01); *A47L 13/20* (2013.01)

(58) Field of Classification Search
CPC ..... A46B 5/002; A46B 5/0041; A46B 5/0045; A46B 5/005; A46B 5/0054; A46B 5/0058; A47L 13/20; A47L 13/22; A47L 13/24
(Continued)

(56) References Cited

U.S. PATENT DOCUMENTS 359,605 A 3/1887 Harry
388,934 A 9/1888 Trapp
(Continued)

FOREIGN PATENT DOCUMENTS

CN 3544694 7/2006
CN 202060407 U 12/2011
(Continued)

OTHER PUBLICATIONS

Amazon.com: Unger NCAN ErgoTec OptiLoc Tele-Pole Locking Cone, reviews 2016, https://www.amazon.com/Unger-NCAN-ErgoTec-OptiLoc-Tele-Pole/dp/B000FJH5SQ/ref . . . site visited Jun. 18, 2019.

(Continued)

*Primary Examiner* — Lee D Wilson
*Assistant Examiner* — Alberto Saenz
(74) *Attorney, Agent, or Firm* — McCarter & English, LLP; Dave S. Christensen

(57) ABSTRACT

A tool is provided. The tool includes a pole defining an axis and a handle. The handle includes a stationary and rotational portion, the stationary and rotational portions forming a unitary assembly with the stationary and rotational portions being adjacent one another along the axis. The stationary portion is secured to the pole in a manner that prevents it from rotating with respect to the pole and in a manner prevents the stationary portion from translational movement with respect to the pole along the axis. The rotational portion is secured to the stationary portion that allows the rotational portion to freely rotate with respect to the pole about the axis and with respect to the stationary portion and in a manner that prevents the rotational portion from translational movement with respect to the pole and the stationary portion along the axis.

17 Claims, 9 Drawing Sheets

Related U.S. Application Data continuation-in-part of application No. 15/238,262, filed on Aug. 16, 2016, now abandoned.

(60) Provisional application No. 62/556,605, filed on Sep. 11, 2017, provisional application No. 62/298,155, filed on Feb. 22, 2016, provisional application No. 62/206,072, filed on Aug. 17, 2015.

(51) Int. Cl.
*B05B 12/00* (2018.01)
*B25G 1/04* (2006.01)
*B25G 1/06* (2006.01)
*A47L 13/20* (2006.01)

(58) Field of Classification Search
USPC .. 15/115, 143.1, 144.1, 144.2, 144.3, 144.4; 16/430
See application file for complete search history.

(56) References Cited

U.S. PATENT DOCUMENTS

| | | | | |
|---|---|---|---|---|
| 411,673 | A | 9/1889 | Newman | |
| D31,801 | S | 11/1899 | Gardner | |
| 836,115 | A | 11/1906 | Johnson | |
| D43,038 | S | 9/1912 | Gurski | |
| 1,112,906 | A | 10/1914 | Hewett | |
| 1,315,194 | A | 9/1919 | Yamamoto | |
| 1,426,440 | A | 8/1922 | Zieschang | |
| 2,073,170 | A | 3/1937 | Pieper | |
| D114,601 | S | 5/1939 | Hulsh | |
| 2,187,671 | A | 1/1940 | Suddarth | |
| 2,228,573 | A | 1/1941 | Lowe | |
| 2,228,574 | A | 1/1941 | Lowe | |
| 2,237,969 | A | 4/1941 | Olsen | |
| 2,340,530 | A | 2/1944 | Hefner | |
| 2,426,373 | A | 8/1947 | Ogawa et al. | |
| 2,518,984 | A | 8/1950 | William | |
| 2,575,124 | A | 11/1951 | Pollitt | |
| 2,815,522 | A | 12/1957 | Hexter | |
| D186,360 | S | 10/1959 | Lathrop et al. | |
| 2,923,018 | A | 2/1960 | Matthay | |
| 3,039,126 | A | 6/1962 | Kessler | |
| 3,238,822 | A | 3/1966 | Zuracki | |
| 3,436,772 | A | 4/1969 | Stebbins | |
| 3,457,016 | A | 7/1969 | Gotberg | |
| 3,510,028 | A | 5/1970 | Batistelli | |
| 4,088,252 | A | 5/1978 | Grunberger | |
| D262,936 | S | 2/1982 | Nishiyama | |
| 4,324,012 | A | 4/1982 | Cannaday | |
| D268,447 | S | 3/1983 | Sudduth | |
| D274,565 | S | 7/1984 | Smith et al. | |
| 4,704,758 | A | 11/1987 | Hoffman | |
| 4,733,812 | A | 3/1988 | Lewis et al. | |
| 4,769,869 | A | 9/1988 | Benitez | |
| 4,809,388 | A | 3/1989 | Dietrich | |
| D300,506 | S | 4/1989 | Pedone | |
| 4,863,299 | A | 9/1989 | Osberghaus | |
| D306,924 | S | 3/1990 | Shapton | |
| D307,657 | S | 5/1990 | Li | |
| D311,254 | S | 10/1990 | Clair | |
| D317,108 | S | 5/1991 | Cochran | |
| D321,422 | S | 11/1991 | Smith | |
| 5,133,101 | A | 7/1992 | Hauser et al. | |
| D334,694 | S | 4/1993 | McCoy | |
| D339,918 | S | 10/1993 | Chamberlain | |
| D341,234 | S | 11/1993 | Blessing | |
| D341,941 | S | 12/1993 | Stokes | |
| D346,543 | S | 5/1994 | Berti | |
| 5,368,549 | A | 11/1994 | McVicker | |
| 5,375,286 | A | 12/1994 | Harrah | |
| 5,553,759 | A | 9/1996 | McMaster | |
| 5,581,839 | A | 12/1996 | Ferrell, Jr. | |
| 5,632,429 | A | 5/1997 | Cantwell | |
| 5,671,872 | A | 9/1997 | Daniels, Jr. | |
| D387,208 | S | 12/1997 | Collett | |
| 5,720,071 | A | 2/1998 | Hall | |
| 5,771,535 | A | 6/1998 | Blessing | |
| 5,791,006 | A | 8/1998 | Anctil | |
| 5,823,414 | A | 10/1998 | Gal | |
| D401,703 | S | 11/1998 | Beechuk et al. | |
| D403,447 | S | 12/1998 | Parsons | |
| D404,282 | S | 1/1999 | Hsu | |
| 5,888,006 | A | 3/1999 | Ping | |
| D411,673 | S | 6/1999 | Biggs et al. | |
| 5,920,944 | A | 7/1999 | Biggs | |
| 5,927,058 | A * | 7/1999 | Hsu | A01D 7/10 56/400.17 |
| D412,783 | S | 8/1999 | You | |
| 5,954,253 | A | 9/1999 | Swetish | |
| 5,954,420 | A | 9/1999 | Smith | |
| D416,389 | S | 11/1999 | Frazier | |
| D420,561 | S | 2/2000 | Kunkler | |
| 6,023,924 | A | 2/2000 | Babineau | |
| 6,105,194 | A | 8/2000 | Rudolph | |
| 6,170,112 | B1 | 1/2001 | Mayfield | |
| D438,113 | S | 2/2001 | Wadsworth | |
| 6,199,245 | B1 * | 3/2001 | Blessing | B25G 1/06 16/901 |
| D440,837 | S | 4/2001 | Hart | |
| 6,378,922 | B1 | 4/2002 | Troudt | |
| D458,427 | S | 6/2002 | Kunkler et al. | |
| D458,721 | S | 6/2002 | Clarke | |
| 6,397,427 | B1 | 6/2002 | Bryngelsson | |
| 6,449,803 | B1 | 9/2002 | McConchie | |
| 6,487,747 | B2 | 12/2002 | Cavalheiro | |
| 6,497,525 | B1 | 12/2002 | Huang | |
| 6,540,424 | B1 | 4/2003 | Hall | |
| 6,550,998 | B1 | 4/2003 | Fernschild | |
| 6,551,001 | B2 | 4/2003 | Aberegg | |
| 6,579,023 | B2 | 6/2003 | Kunkler | |
| D480,188 | S | 9/2003 | Blouse' | |
| 6,612,768 | B2 | 9/2003 | Zorzo | |
| D481,290 | S | 10/2003 | Thompson | |
| D482,829 | S | 11/2003 | Vosbikian et al. | |
| 6,651,853 | B2 | 11/2003 | Higgins | |
| 6,655,866 | B1 | 12/2003 | Morad | |
| 6,659,670 | B1 | 12/2003 | Blouse | |
| 6,663,306 | B2 | 12/2003 | Policicchio | |
| 6,669,391 | B2 | 12/2003 | Policicchio | |
| D485,954 | S | 1/2004 | Hall et al. | |
| 6,695,516 | B2 | 2/2004 | Defields | |
| 6,722,806 | B2 | 4/2004 | Kunkler | |
| 6,726,388 | B1 | 4/2004 | Monahan | |
| D490,561 | S | 5/2004 | Angeletta | |
| 6,799,916 | B2 | 10/2004 | Fernschild | |
| 6,814,466 | B2 | 11/2004 | Parsons et al. | |
| 6,854,911 | B2 | 2/2005 | Policicchio | |
| 6,854,912 | B2 | 2/2005 | Dyer | |
| D505,762 | S | 5/2005 | Lalanne | |
| 6,889,917 | B2 | 5/2005 | Fahy | |
| 6,892,915 | B2 | 5/2005 | Mares | |
| 6,893,180 | B2 | 5/2005 | Hall | |
| 6,899,485 | B2 | 5/2005 | Hall | |
| 6,951,430 | B2 | 10/2005 | Fernschild | |
| 6,953,299 | B2 | 10/2005 | Wang | |
| 6,955,490 | B2 | 10/2005 | Chase | |
| 6,960,042 | B1 | 11/2005 | Hsiao | |
| 6,964,535 | B2 | 11/2005 | Bell | |
| D514,267 | S | 1/2006 | Tsai | |
| 6,981,533 | B2 | 1/2006 | Zorzo | |
| 6,986,618 | B2 | 1/2006 | Hall | |
| 6,986,619 | B2 | 1/2006 | Hall | |
| 7,004,658 | B2 | 2/2006 | Hall | |
| 7,040,510 | B1 | 5/2006 | Hester | |
| 7,048,458 | B2 | 5/2006 | Hall | |
| 7,048,804 | B2 | 5/2006 | Kisela | |
| 7,056,050 | B2 | 6/2006 | Sacks | |
| 7,120,962 | B2 * | 10/2006 | Petner | A47L 13/12 15/228 |
| 7,121,598 | B2 | 10/2006 | Pourtier et al. | |
| 7,160,044 | B2 | 1/2007 | Dyer | |
| 7,163,349 | B2 | 1/2007 | Policicchio | |

(56) References Cited

U.S. PATENT DOCUMENTS

D536,850 S 2/2007 Sacks
7,172,099 B2 2/2007 Hofte
7,191,486 B1 3/2007 Michelson
D542,492 S 5/2007 Chang
D542,493 S 5/2007 Berti
D547,508 S 7/2007 Thomas
D547,554 S 7/2007 Ajluni et al.
D548,909 S 8/2007 Murray
D552,314 S 10/2007 Harper et al.
7,341,389 B2 3/2008 Chase
D568,567 S 5/2008 Baumkirchner et al.
7,373,708 B2 5/2008 Stable et al.
D574,741 S 8/2008 Gadsden
7,431,524 B2 10/2008 Sacks
D583,118 S 12/2008 Snyder
D586,514 S 2/2009 Perelli
D590,117 S 4/2009 Crawford
D592,819 S 5/2009 Crawford
D597,269 S 7/2009 McNeil et al.
D602,664 S 10/2009 Crawford
D604,610 S 11/2009 Ames et al.
7,618,206 B2 11/2009 Sacks
7,621,686 B2 11/2009 Fernschild
D607,165 S 12/2009 Libman et al.
D608,885 S 1/2010 Sneddon et al.
7,653,958 B2 2/2010 Rosenzweig
D611,668 S 3/2010 Wessel
7,670,073 B2 3/2010 Fernschild
D614,824 S 4/2010 Heidel et al.
7,699,551 B2 4/2010 Suda
7,708,485 B2 5/2010 Tanaka
7,722,273 B2 5/2010 Tanaka
D618,411 S 6/2010 Crawford
D623,071 S 9/2010 Driskell et al.
7,794,165 B2 9/2010 Balz
D628,352 S 11/2010 Libman et al.
D629,984 S 12/2010 Carlson
7,850,384 B2 12/2010 Sacks
D634,497 S 3/2011 Robertson et al.
D636,262 S 4/2011 Michitsuji et al.
D639,661 S 6/2011 Llerena
7,992,258 B1 8/2011 Stitser
D648,466 S 11/2011 Hickman
8,069,520 B2 12/2011 Mattucci
8,079,770 B2 12/2011 Widmer
8,162,194 B2 4/2012 Gleason
D660,533 S 5/2012 Hill
D660,667 S 5/2012 Miyazaki
D661,036 S 5/2012 Raven
8,186,898 B2 5/2012 Bradbury
D661,442 S 6/2012 Kandasamy
8,205,293 B2 6/2012 Rosenzweig
8,241,427 B1 8/2012 Crawford et al.
8,267,607 B2 9/2012 Harris
8,375,499 B1 2/2013 Marino
D680,701 S 4/2013 Carlson
8,425,137 B1 4/2013 Sampaio
8,449,212 B2 5/2013 Crawford
D685,968 S 7/2013 Smith
D694,483 S 11/2013 Hines
8,596,896 B2 12/2013 Kimura
D699,412 S 2/2014 Smith
8,641,309 B2 2/2014 Perry
D700,521 S 3/2014 Finlay
8,662,778 B2 3/2014 Crawford
8,667,637 B2 3/2014 Vrdoljak
8,672,203 B2 3/2014 Staudecker
8,807,858 B2 8/2014 Fitzpatrick
8,834,053 B2 9/2014 Van Landingham, Jr.
8,844,088 B2 9/2014 Garcia Castillo
D718,011 S 11/2014 Lentine
8,894,315 B2 11/2014 Dingert
8,927,480 B2 1/2015 Williams
D722,857 S 2/2015 Huang
8,973,200 B2 3/2015 Mallett
9,004,563 B2 4/2015 Buzby
D731,244 S 6/2015 Kohl
D731,321 S 6/2015 Farrell et al.
9,044,132 B2 6/2015 Kaminer
D739,484 S 9/2015 Kaye
9,131,824 B2 9/2015 Crawford
D741,655 S 10/2015 Whelan et al.
D742,609 S 11/2015 Irwin
D746,009 S 12/2015 Berti
D747,054 S 1/2016 Seifts et al.
D758,878 S 6/2016 Hoeke et al.
D764,129 S 8/2016 Kindler
9,420,933 B1 8/2016 Kellis
D770,848 S 11/2016 Wilson et al.
D775,893 S 1/2017 Buckley et al.
D784,085 S 4/2017 Langston
D790,279 S 6/2017 Izen
D790,342 S 6/2017 Farrell et al.
D792,044 S 7/2017 Harrington
D794,890 S 8/2017 Hoyle
D795,694 S 8/2017 Yefrernow
9,743,819 B2 8/2017 Davidshofer
D796,366 S 9/2017 Talamo
9,795,268 B2 10/2017 Hoyle
D806,338 S 12/2017 Metzel et al.
D835,871 S 12/2018 Breit et al.
D858,020 S 8/2019 Gooden
2002/0144369 A1 10/2002 Biggs
2002/0174641 A1 11/2002 Biggs
2003/0000036 A1 1/2003 Fan
2003/0009839 A1 1/2003 Streutker et al.
2003/0052204 A1 3/2003 Aberegg
2003/0089383 A1 5/2003 Biggs
2003/0103795 A1 6/2003 Hollars et al.
2003/0126710 A1 7/2003 Policicchio
2003/0150478 A1 8/2003 Biggs
2003/0200631 A1 10/2003 Clarke
2004/0046628 A1 3/2004 Hofte et al.
2004/0047670 A1 3/2004 Martin
2004/0055099 A1 3/2004 Greenberg
2004/0071490 A1 4/2004 Vosbikian
2004/0134016 A1 7/2004 Kisela
2004/0134955 A1 7/2004 Williams
2004/0141797 A1 7/2004 Garabedian
2004/0141798 A1 7/2004 Garabedian et al.
2004/0146333 A1 7/2004 Fu
2004/0173656 A1 9/2004 Seong
2004/0178224 A1 9/2004 Fahy et al.
2004/0223803 A1 11/2004 Fahy
2005/0050689 A1 3/2005 Biggs
2005/0058500 A1 3/2005 Hall et al.
2005/0089360 A1 4/2005 Garabedian, Jr.
2005/0095053 A1 5/2005 Harris
2005/0191116 A1 9/2005 Flanery
2005/0205634 A1 9/2005 Han
2005/0251943 A1 11/2005 Van Landingham
2005/0274766 A1 12/2005 Cheng
2006/0008317 A1 1/2006 Livingstone
2006/0039743 A1 2/2006 Mensink
2006/0110207 A1 3/2006 Augustinus Hofte et al.
2006/0151558 A1 7/2006 Higgins
2006/0200924 A1 9/2006 Hampton
2006/0207042 A1 9/2006 Di Paolo
2006/0213017 A1 9/2006 Bele
2006/0222441 A1 10/2006 Tanaka
2006/0245820 A1 11/2006 Kresse et al.
2006/0280546 A1 12/2006 Dyer
2007/0020040 A1 1/2007 Sacks
2007/0140774 A1 6/2007 Dyer
2007/0231046 A1 10/2007 Whiffen
2007/0295758 A1 12/2007 Foster et al.
2008/0038045 A1 2/2008 Hofte et al.
2008/0107471 A1 5/2008 Fitzpatrick et al.
2009/0176683 A1 7/2009 Choe et al.
2009/0183591 A1 7/2009 Jesse
2010/0116861 A1 5/2010 Burrowes
2011/0064513 A1 3/2011 Landingham
2011/0158740 A1 6/2011 Kandasamy
2011/0247157 A1 10/2011 Caillou

(56) References Cited

U.S. PATENT DOCUMENTS

| | | | | |
|---|---|---|---|---|
| 2011/0309124 | A1 | 12/2011 | Dubois | |
| 2012/0133161 | A1 | 5/2012 | Mitchell | |
| 2012/0227763 | A1 | 9/2012 | Hayes | |
| 2012/0255138 | A1 | 10/2012 | Dingert | |
| 2012/0304408 | A1* | 12/2012 | Crawford ................ | A47L 13/22 15/143.1 |
| 2013/0056467 | A1 | 3/2013 | Shepard et al. | |
| 2013/0263398 | A1 | 10/2013 | Irwin et al. | |
| 2013/0291893 | A1 | 11/2013 | Stokes | |
| 2014/0317868 | A1 | 10/2014 | Fitzpatrick | |
| 2015/0082570 | A1 | 3/2015 | Davidshofer | |
| 2015/0101140 | A1 | 4/2015 | Pierce | |
| 2015/0246440 | A1 | 9/2015 | Balestrieri | |
| 2016/0001442 | A1 | 1/2016 | Buzby | |
| 2016/0198925 | A1 | 7/2016 | Hoyle | |
| 2016/0345793 | A1 | 12/2016 | Hansen | |
| 2016/0374256 | A1 | 12/2016 | Chou | |
| 2016/0374532 | A1 | 12/2016 | Patterson et al. | |
| 2017/0014986 | A1 | 1/2017 | Chou | |
| 2017/0049291 | A1 | 2/2017 | Harrington et al. | |
| 2017/0049292 | A1 | 2/2017 | Harrington et al. | |
| 2017/0157762 | A1 | 6/2017 | Monahan et al. | |
| 2017/0296024 | A1 | 10/2017 | Zhu | |
| 2018/0103819 | A1 | 4/2018 | Hoyle | |
| 2019/0001480 | A1 | 1/2019 | Harrington et al. | |
| 2019/0090715 | A1 | 3/2019 | Wildeman et al. | |
| 2020/0009715 | A1 | 1/2020 | Moreau et al. | |
| 2021/0228052 | A1 | 7/2021 | Harrington et al. | |

FOREIGN PATENT DOCUMENTS

| | | | |
|---|---|---|---|
| CN | 202960407 | U | 6/2013 |
| CN | 204158328 | U | 2/2015 |
| CN | 303214007 | | 5/2015 |
| CN | 105266731 | A | 1/2016 |
| EP | 1761155 | B1 | 3/2007 |
| GB | 2381230 | A | 4/2003 |
| JP | D1400629 | A | 10/2010 |
| JP | D1524718 | A | 4/2015 |
| JP | D1545354 | | 3/2016 |
| KR | 3004899850000 | | 5/2008 |
| KR | 3006913060000 | | 5/2013 |
| WO | WO199823385 | A1 | 6/1998 |
| WO | 2006002655 | A1 | 1/2006 |
| WO | 2008137414 | A2 | 11/2008 |
| WO | D098967003 | | 12/2017 |
| WO | D098967005 | | 12/2017 |
| WO | D098967006 | | 12/2017 |

OTHER PUBLICATIONS

AmazonSmile: Spray Mops for Floor Cleaning-New Leader, website 2017, https://smile.amazon.com/Cleaning-New-Leader-Professional-Degree-Hardwood/dp/B077N . . . site visted Jan. 5, 2018.

Bell® Pump™ 300 Blue BMX, website 2018, site visited Aug. 29, 2018, https://www.walmart.com..=nul&athznid=tic&athieid=v0&athstid=CS020&ATHGUID=4660015-F02e92b6-c338c201a4714605&athena=true.

Pole Part—Unger—TelepPlus, ABC Window Cleaning website2018, https://www.window-cleaning-supply.com/pole-part-unger-teleplus-plus 4-grip/, site visited Sep. 4, 2018.

Staples download, Excella Floor Cleaning Kit, 2018 article reference, https://www.quill.com/unger-excella-microfiber-floor-cleaning-kit-18-holder-efkt1/cbs/55135444.html, site visited Aug. 27, 2019.

Telescopic Pole—4-8' H-1920—Uline, website 2019, https://www.uline.com/Product/Detail/H-1920/Mops-Squeegees-and-Carts/Telescopic-Pole-4-8?keywords=telescopic+pole+-+4-8%27, sited visited Jun. 18, 2019.

Unger erGO! Clean Floor Cleaning Kit Flap Mop, Unger Germany website 2016, https://www.ungerglobal.com/en/ergo-clean-floor-cleaning-kit-flat-mop, site visited Aug. 27, 2019.

Unger erGO! clean floor cleaning kit, website 2016, https://www.ungerglobal.com/en/ergo-clean-floor-cleaning-kit-pocketmop, site visited Jan. 18, 2018.

Unger erGO! Clean Mopping Kit PRO-BCHS website 2019, https://www.bunzlchs.com/Janitorial/Flat-Mopping/Other-Flat-Mopping-Systems/Unger-erGO-Clean-Mopping-Kit-PRO-p-018404, site visited Aug. 27, 2019.

Unger mop video, video date Sep. 19, 2017, site visited Jan. 18, 2018, https://www.youtube.com/watch?v=G42VJEfJTrs.

* cited by examiner

TOOL HANDLES HAVING STATIONARY AND ROTATIONAL PORTIONS

CROSS REFERENCE TO RELATED APPLICATIONS

This application is a continuation of U.S. application Ser. No. 16/124,809, filed on Sep. 7, 2018, which claims the benefit of U.S. Provisional Application 62/556,605, filed on Sep. 11, 2017 and is a continuation-in-part of U.S. application Ser. No. 15/238,262, filed on Aug. 16, 2016, which claims the benefit of U.S. Provisional Application 62/298,155, filed on Feb. 22, 2016 and U.S. Provisional Application 62/206,072, filed on Aug. 17, 2015, and related to, the entire contents of all of which are incorporated by reference herein.

BACKGROUND OF THE INVENTION

The present disclosure is related to tool handles. More particularly, the present disclosure is related to tool handles that have stationary and rotational portions.

Various tools such as, but not limited to, cleaning tools (e.g., mops) are used in many commercial and/or residential settings together with poles. In some instances, the tool includes a handle or grip (hereinafter "handle") on one or more locations of the pole where the user places their hand(s). The handle can provide improved comfort, improved grip, and other attributes.

Often, the use of the tool requires movement of the pole in a number of different directions. As a result of the above, it has been determined by the present disclosure that there is a need for handles that have both stationary and rotational portions in order to overcome, alleviate, and/or mitigate one or more of the aforementioned and other deleterious effects of prior art handles.

Accordingly, while existing tools and tool handles are suitable for their intended purpose the need for improvement remains, particularly in providing a tool or a tool handle having the features described herein.

SUMMARY

According to an embodiment, a tool is provided. The tool includes a pole defining an axis and a first handle. The first handle includes both a first stationary portion and a first rotational portion, the first stationary portion and the first rotational portion forming a unitary assembly with the first stationary portion and the first rotational portion being immediately adjacent one another along the axis. The first stationary portion is secured to the pole in a manner that prevents the first stationary portion from rotational movement with respect to the pole about the axis and in a manner prevents the first stationary portion from translational movement with respect to the pole along the axis. The first rotational portion is secured to the first stationary portion in a manner that allows the first rotational portion to freely rotate with respect to the pole about the axis and with respect to the first stationary portion and in a manner that prevents the first rotational portion from translational movement with respect to the pole and the first stationary portion along the axis.

In some embodiments either alone or together with any one or more of the aforementioned and/or after-mentioned embodiments, the first handle is positioned so that the first stationary portion is at a top of the pole.

In some embodiments either alone or together with any one or more of the aforementioned and/or after-mentioned embodiments, the first handle is positioned so that the first rotational portion is at a top of the pole.

In some embodiments either alone or together with any one or more of the aforementioned and/or after-mentioned embodiments, the first handle is at region other than the top of the pole.

In some embodiments either alone or together with any one or more of the aforementioned and/or after-mentioned embodiments, a second handle is provided having a second stationary portion and a second rotational portion. The second stationary portion and the second rotational portion forming a second unitary assembly with the second stationary portion and the second rotational portion being immediately adjacent one another along the axis. The second stationary portion is coupled to the pole at a region other than the top of the pole.

In some embodiments either alone or together with any one or more of the aforementioned and/or after-mentioned embodiments, the first handle further comprises an activation trigger.

In some embodiments either alone or together with any one or more of the aforementioned and/or after-mentioned embodiments, the activation trigger is positioned on the first rotational portion.

In some embodiments either alone or together with any one or more of the aforementioned and/or after-mentioned embodiments, wherein the activation trigger is positioned on the first stationary portion.

In some embodiments either alone or together with any one or more of the aforementioned and/or after-mentioned embodiments, the first handle further comprises a rotational coupler, the rotational coupler securing the first stationary portion and the first rotational portion to one another.

In some embodiments either alone or together with any one or more of the aforementioned and/or after-mentioned embodiments, the first stationary portion has a length of between 2-4 inches.

In some embodiments either alone or together with any one or more of the aforementioned and/or after-mentioned embodiments, the first stationary portion has a length of about 2 inches.

In some embodiments either alone or together with any one or more of the aforementioned and/or after-mentioned embodiments, the first rotational portion has a length along the axis that is between 4-6 inches.

In some embodiments either alone or together with any one or more of the aforementioned and/or after-mentioned embodiments, the first stationary portion and the first rotational portion have a common outer diameter.

In some embodiments either alone or together with any one or more of the aforementioned and/or after-mentioned embodiments, the pole is a straight pole or a bent pole.

In some embodiments either alone or together with any one or more of the aforementioned and/or after-mentioned embodiments, the pole is a fixed length pole or a telescoping pole.

In some embodiments either alone or together with any one or more of the aforementioned and/or after-mentioned embodiments, the first handle further comprises one or more gripping regions positioned and/or configured to assist in gripping of the handle.

In accordance with another embodiment a method of moving a tool back-and-forth, is provided. The method includes positioning an upper hand on an upper handle of a pole so that a first portion of the upper hand grasps a stationary portion of the upper handle and a second portion of the upper hand grasps a rotational portion of the upper handle. A lower hand is positioned on a lower handle of the pole so that a first portion of the lower hand grasps a stationary portion of the lower handle and a second portion of the lower hand grasps a rotational portion of the lower handle. The user switches between grasping the stationary and/or rotational portions of the upper and/or lower handles by adjusting which of the first and second portions of the upper and/or lower hands applies pressure to the upper and/or lower handles, respectively.

In some embodiments either alone or together with any one or more of the aforementioned and/or after-mentioned embodiments, the switching step comprises using only the first portion of the upper and lower hands to apply pressure to only the stationary portions of the upper and lower handles.

In some embodiments either alone or together with any one or more of the aforementioned and/or after-mentioned embodiments, the switching step comprises using only the second portion of the upper and lower hands to apply pressure to only the rotational portions of the upper and lower handles.

In some embodiments either alone or together with any one or more of the aforementioned and/or after-mentioned embodiments, the switching step comprises: using only the first portion of the lower hand to apply pressure to only the stationary portion of the lower handle; and using only the second portion of the upper hand to apply pressure to only the rotational portion of the upper handle In some embodiments either alone or together with any one or more of the aforementioned and/or after-mentioned embodiments, the switching step comprises using only the second portion of the lower hand to apply pressure to only the rotational portion of the lower handle; and using only the first portion of the upper hand to apply pressure to only the stationary portion of the upper handle.

The above-described and other features and advantages of the present disclosure will be appreciated and understood by those skilled in the art from the following detailed description, drawings, and appended claims.

DETAILED DESCRIPTION

Figure 1:
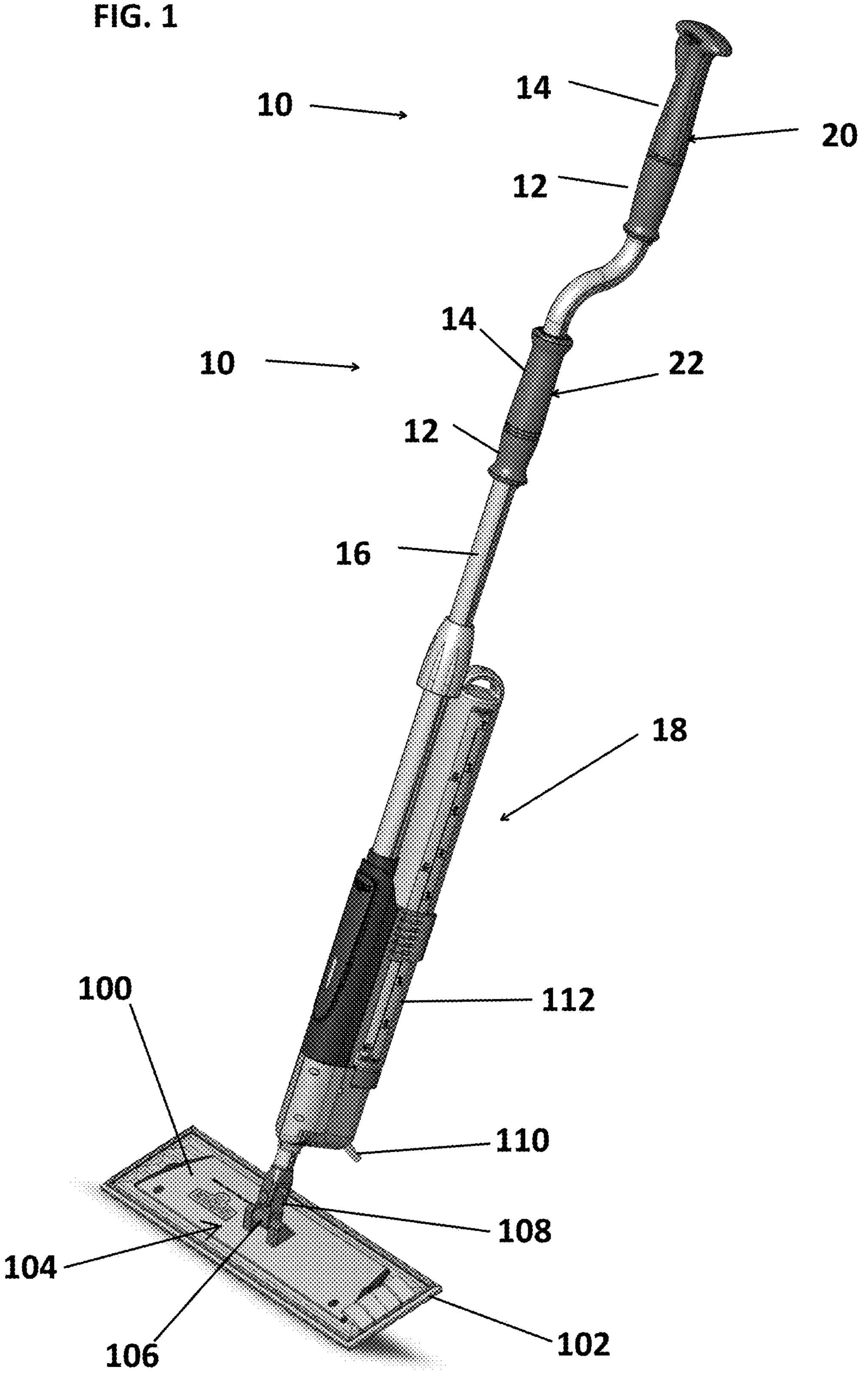
FIG. 1 is a perspective view of a tool having a bent or offset pole in use with exemplary embodiments of top and middle handles according to the present disclosure.
Figure 2:
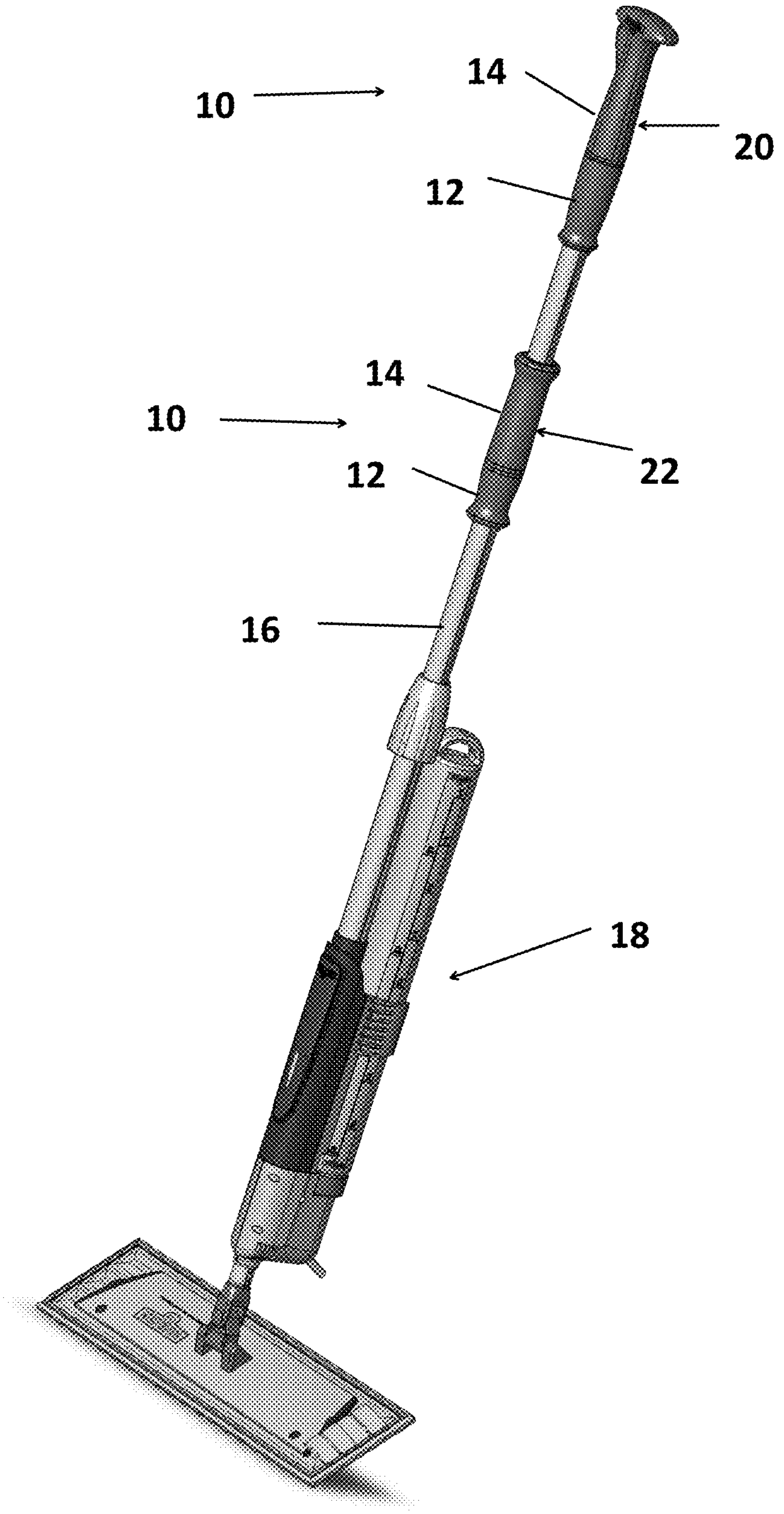
FIG. 2 is a perspective view of a tool having a straight pole in use with the top and middle handles of FIG. 1.

Referring to the drawings and in particular to FIGS. 1-2, exemplary embodiments of handles according to the present disclosure are shown and are generally referred to by reference numeral 10. Advantageously, handles 10 have both a stationary portion 12 and a rotational portion 14, which have been found by the present disclosure to provide enhanced utility by allowing the user more gripping and use choices than previously possible.

Handles 10 are shown in use with a pole 16 having a tool 18. For ease of discussion, tool 18 is shown as cleaning implement as disclosed in Applicant's own U.S. application Ser. No. 15/238,262, which is incorporated herein by reference. Of course, it should be recognized that handles 10 are contemplated for use with any desired tool. Similarly, pole 16 is shown for ease of discussion as being either a bent/offset pole (FIG. 1) or a straight pole (FIG. 2). Of course, it should also be recognized that handles 10 are contemplated for use with any desired pole, including fixed length poles or telescoping poles. In this illustrative embodiment, the tool 18 includes a flat mop 100 configured to receive a cleaning cloth 102. The flat mop 100 attaches to the pole 16 by a universal joint 104 having a first pivot axis 106 and a second pivot axis 108. A rear facing agent dispensing device 110 is arranged to dispense a cleaning agent from a reservoir 112. Advantageously, the tool 18 is easily configurable to dispense the cleaning agent under the force of gravity from the reservoir 112. The universal joint 104 is, preferably, rotatable about the two axes 106, 108 to improve the ease of use of tool 18. In some embodiments, joint 22 is configured so that at least one of the two axes 106, 108 is lockable to improve the ease of use of tool 18. Of course, it is contemplated by the present disclosure for the universal joint 104 to have unrestrained movement and, thus, to lack any lock. The agent dispensing device 110 is illustrated as part of an agent dispensing system to dispense the cleaning agent from the reservoir 112 proximate a leading edge of the flat mop 100 in a pull direction.

Figure 3:
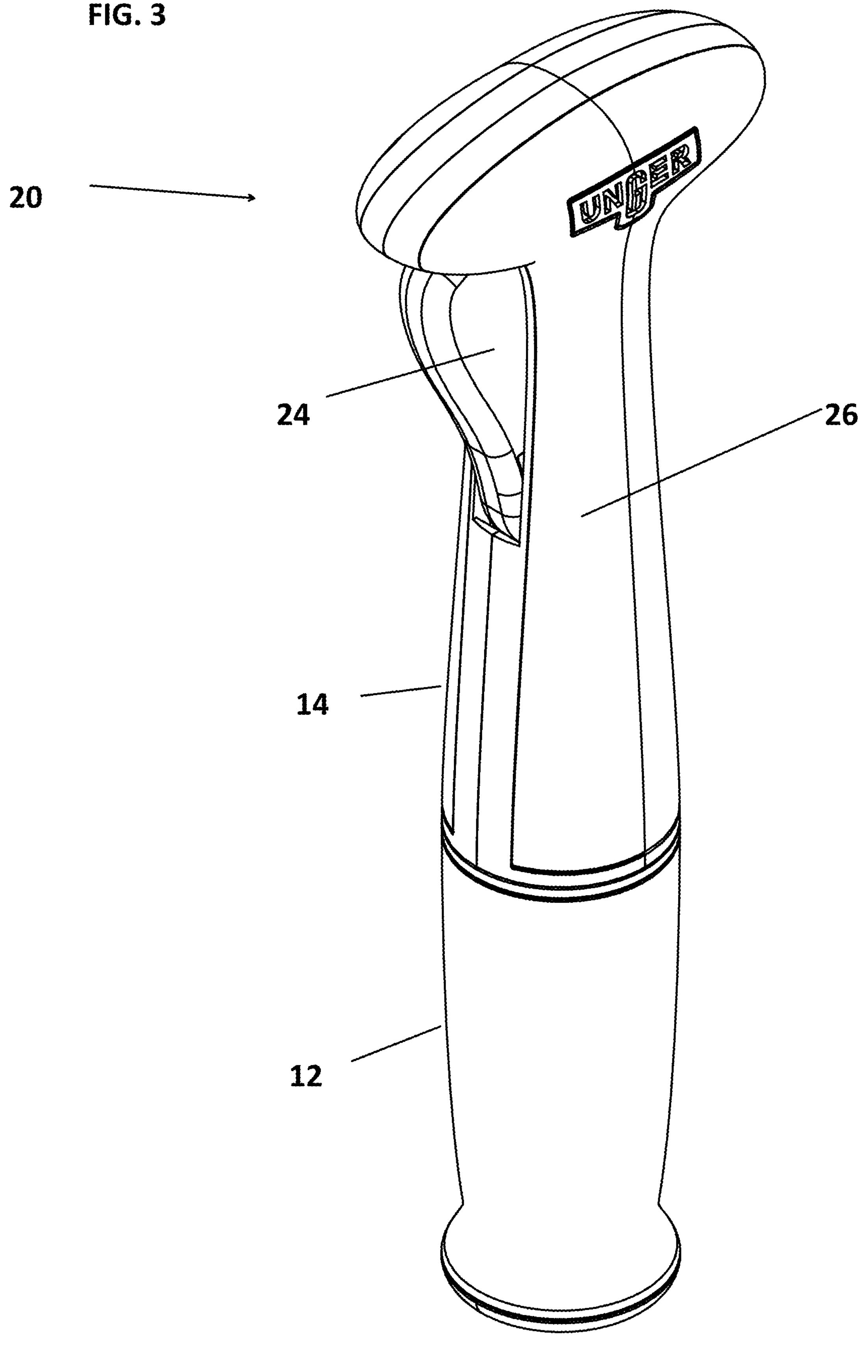
FIG. 3 is a perspective view of an exemplary embodiment of the top handle of FIGS. 1 and 2.
Figure 4:
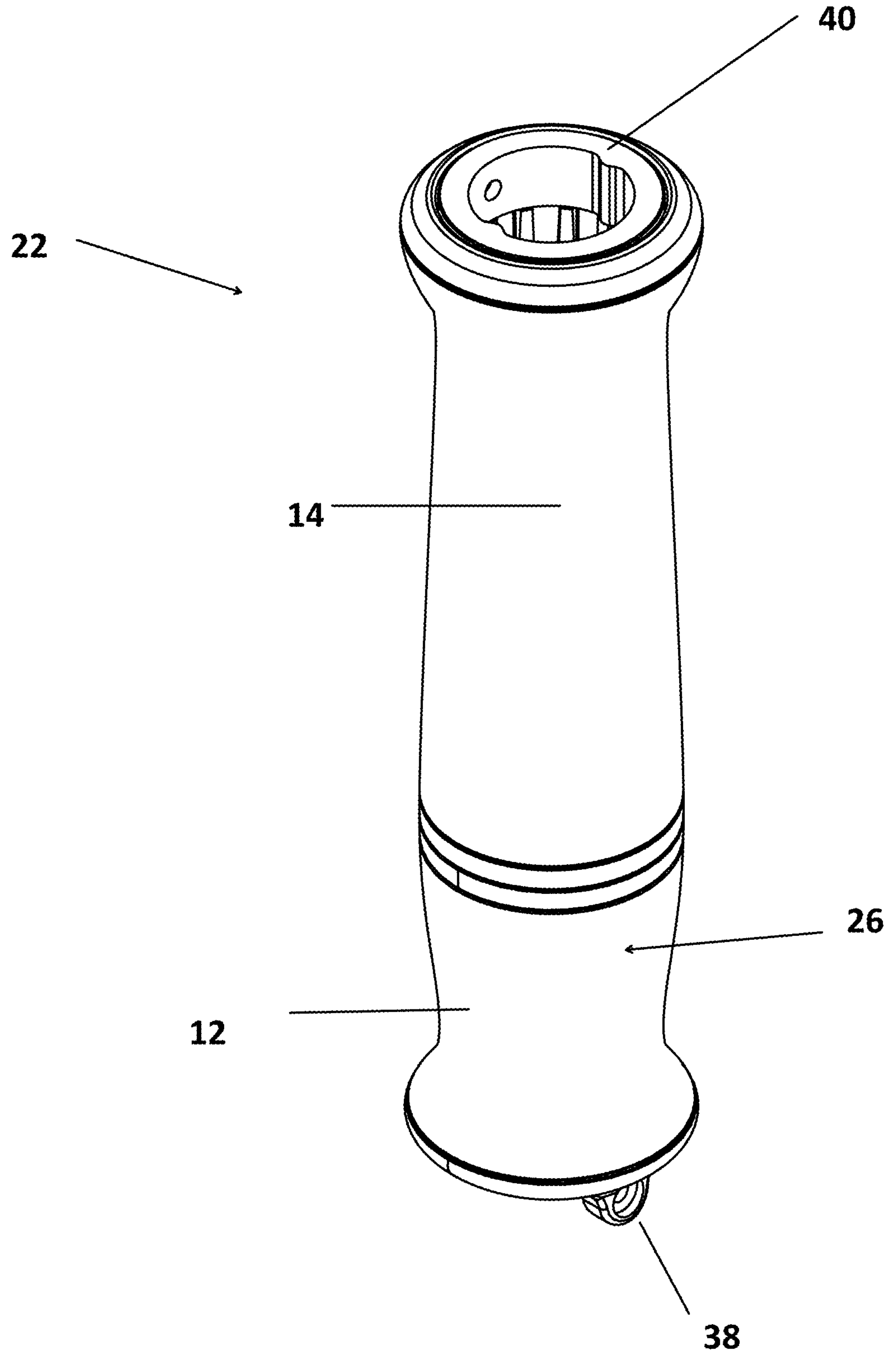
FIG. 4 is a perspective view of an exemplary embodiment of the middle handle of FIGS. 1 and 2.

Handles 10 are shown in FIG. 1 and FIG. 2 with two different variants, namely as a top handle 20, shown in more detail in FIG. 3 and a middle handle 22, shown in more detail in FIG. 4. Top handle 20 and middle handle 22 each include stationary portion 12 and rotational portion 14.

Figure 5:
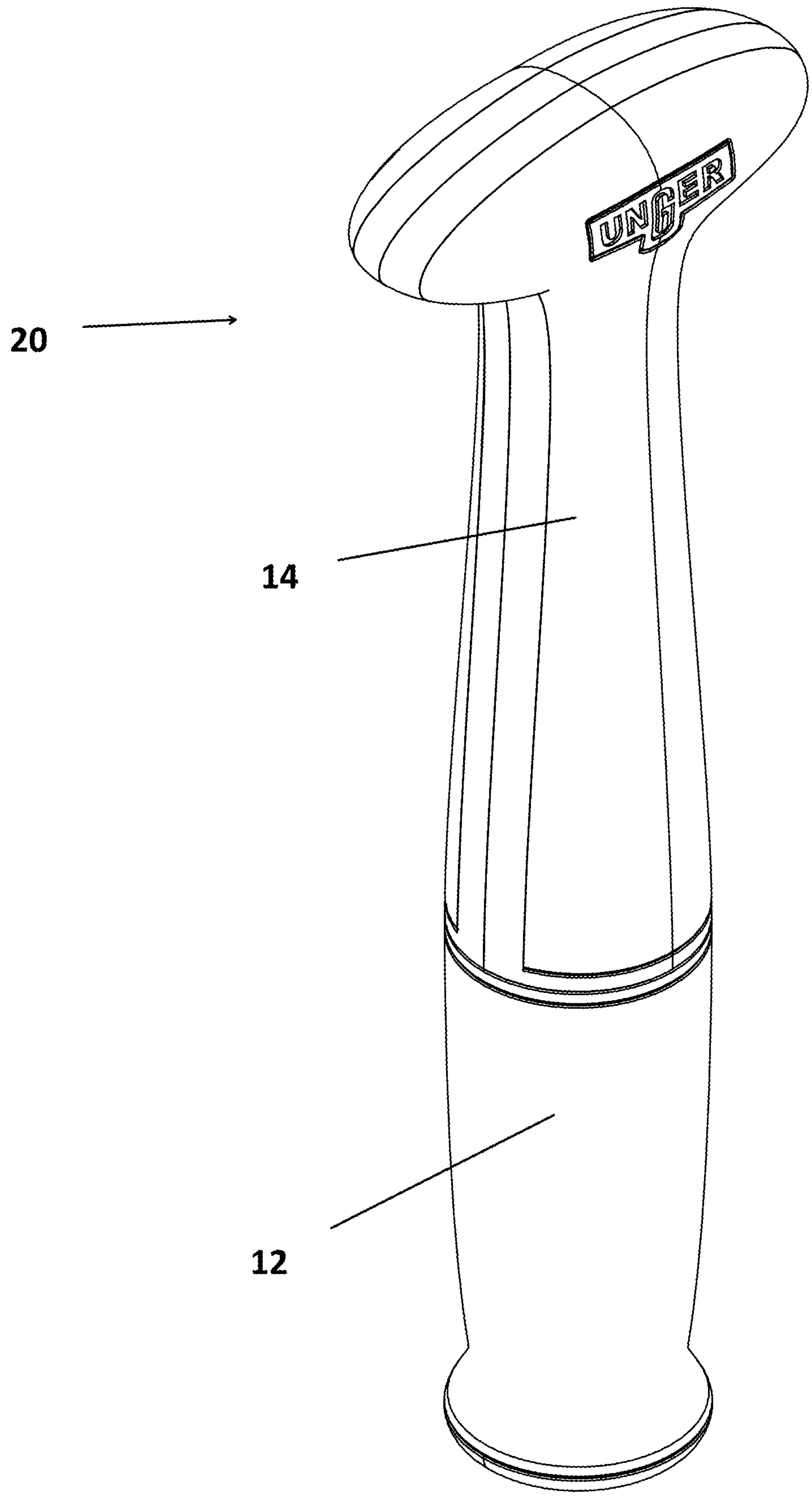
FIG. 5 is a perspective view of an alternate exemplary embodiment of the top handle of FIG. 3.

Additionally, top handle 20 includes an activation trigger 24 that can be operatively connected to one or more portions of tool 18. In the illustrated embodiment, trigger 24 is positioned on the rotational portion 14. Of course, it is contemplated by the present disclosure for trigger 24 to be positioned on the stationary portion 12. Alternately in another embodiment, and as shown in FIG. 5, it is contemplated by the present disclosure for top handle 20 to lack any trigger. Moreover and although not shown, in still further embodiments it is contemplated by the present disclosure for middle handle 22 to include a trigger positioned on either stationary or rotational portions 12, 14.

In some embodiments, handles 20, 22 can include one or more gripping regions 26. Gripping regions 26 can be formed of material that provides increased friction, provides softer materials than pole 16, provides raised or textured areas, provides a diameter large enough for comfortable gripping as pole 16 can of the be too small to easily hold, or any other attribute to assist in gripping. For example, it is contemplated by the present disclosure for handles 10 to be made of any desired material. For example, handles 20, 22 can be made of plastics such as, but not limited to, polypropylene (PP), polyoxymethylene (POM), acrylonitrile butadiene styrene (ABS), and others, and can include one or more thermoplastic elastomers (TPE) gripping regions 26.

Figure 6:
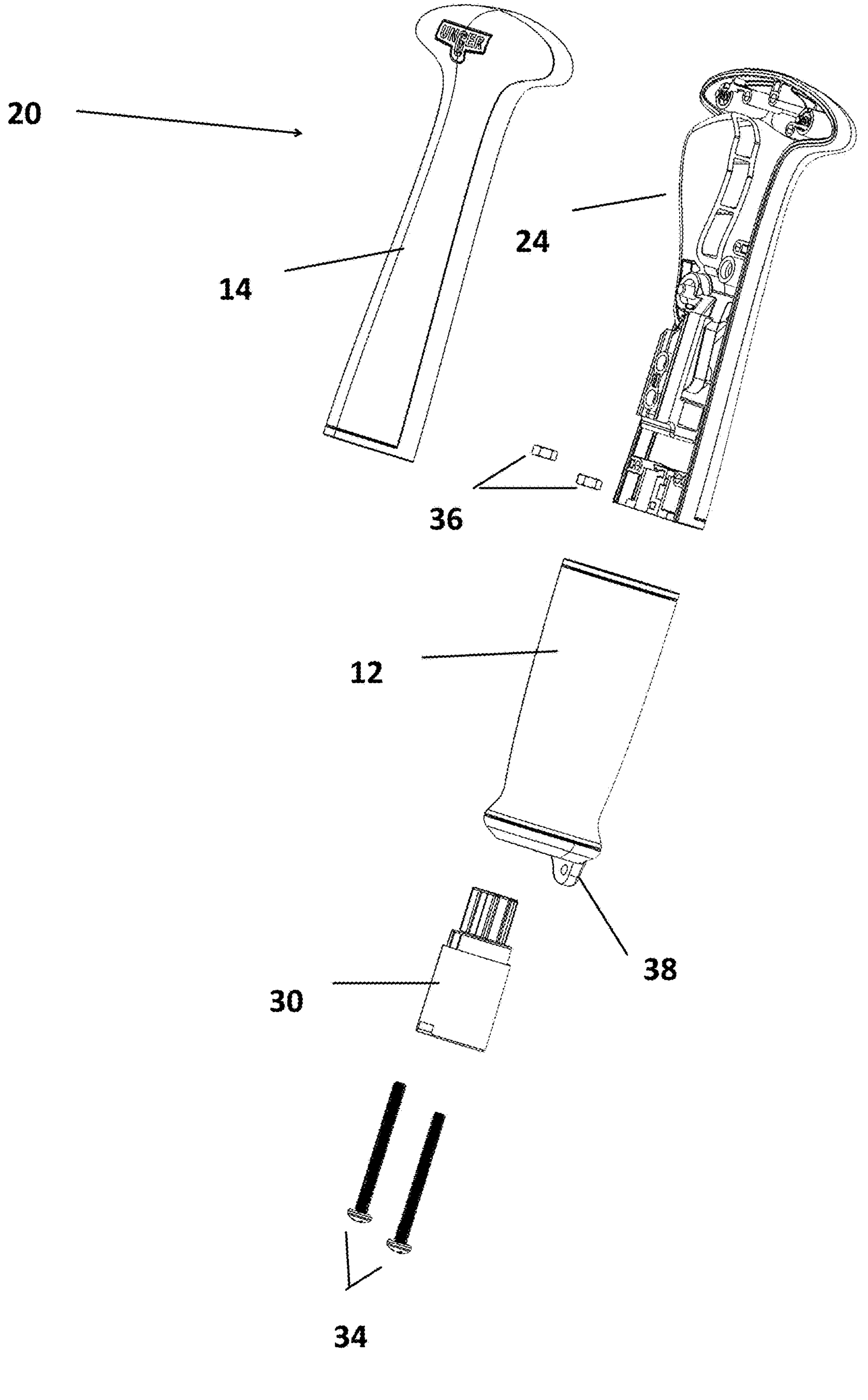
FIG. 6 is a perspective, partially exploded view of the top handle of FIG. 3.
Figure 7:
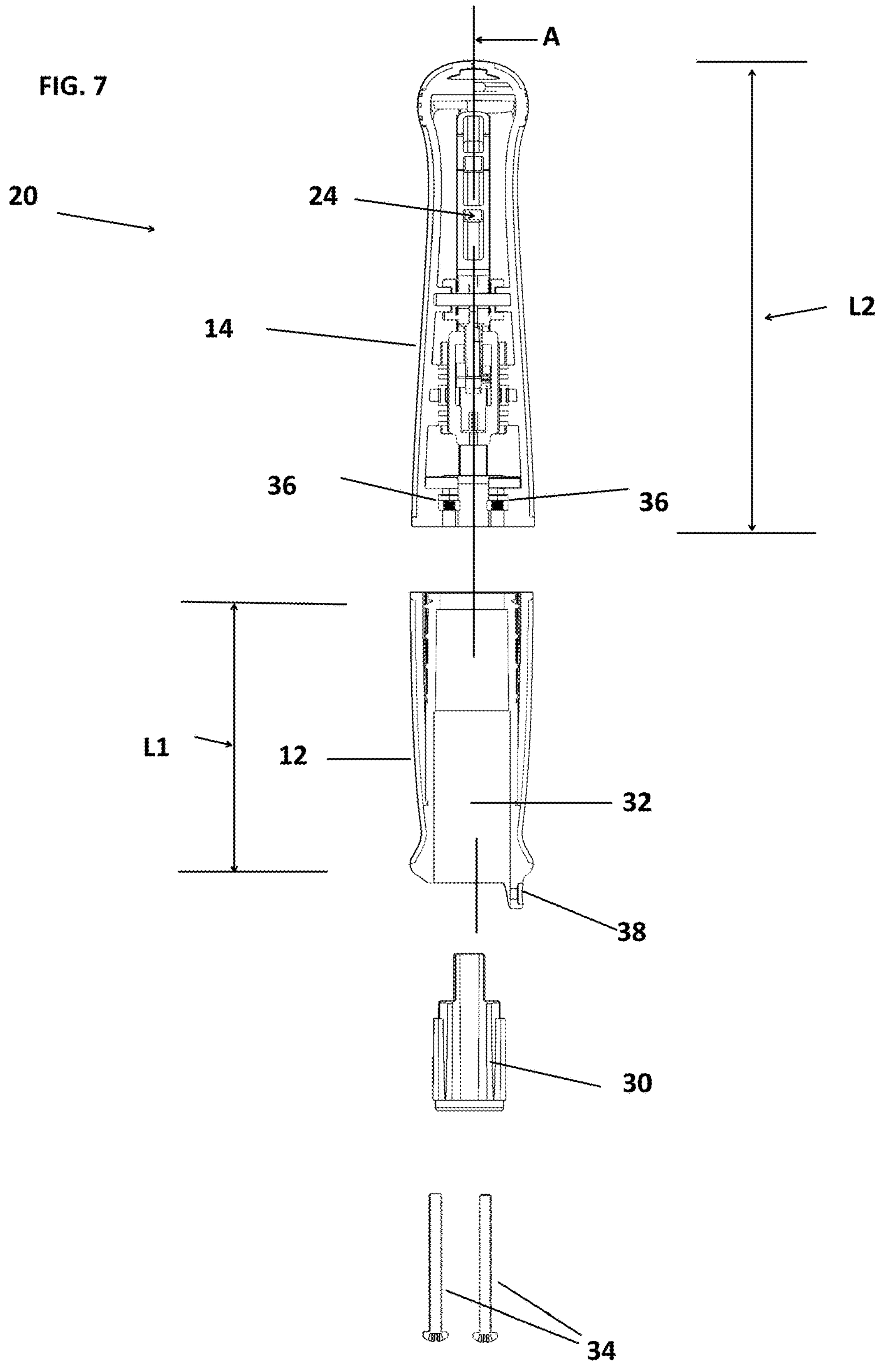
FIG. 7 is a sectional, partially exploded view of the top handle of FIG. 3.

Top handle 20 is described in more detail with reference to FIG. 6 and FIG. 7. Top handle 20 includes stationary portion 12, rotational portion 14, and a rotational coupler 30.

Rotational coupler 30 secures stationary and rotational portions 12, 14 to one another so as to allow the portions to freely rotate with respect to one another about a longitudinal axis (A), but prevents translational movement of the portions with respect to one another along the axis (A). Stationary portion 12 is secured to pole 16 in a manner that prevents rotation about the axis (A) and prevents translational movement along the axis (A).

As used herein, the terms "freely rotate" and "free rotation" shall mean rotate at a torque of less than about 15 kg-mm, with less than 10 kg-mm being desired, and less than 3 kg-mm being desired.

In one or more of the embodiments disclosed herein, portions 12, 14 have a length (L1, L2) along the axis (A) that is sufficient to allow the user to grip the respective portion. In some embodiments, stationary portion 12 has a length (L1) of between 2 to 4 inches, while rotational portion 14 has a length (L2) of between 4 to 6 inches with between 4 to 5 inches being desired.

Here, the present application has found that—particularly in middle handle 22—that the length (L1) of stationary portion 12 need not be sufficient to receive the entire hand of the user. Rather, it has been determined that length (L2) of stationary portion 12 of middle handle 22 having enough length to receive one or two fingers (i.e., about 2 inches) provides sufficient area for the user to control tool 18 by preventing rotation when desired. For example, positioning of stationary and rotational portions 12, 14 into a unitary assembly immediately adjacent one another allows the user to have their hand bridge the two portions so that some fingers are on the stationary portion 12 and others are on the rotational portion 14. In this manner, the user can switch between grasping the stationary portion 12 and grasping the rotational portion 14 by merely adjusting which of their fingers is applying pressure to the handles 20, 22. In some embodiments, portions 12, 14 are configured with outer diameters that are common to allow easy transition between the two portions and/or to allow for grasping of both portions with different fingers of the same hand.

During assembly, rotational coupler 30 is inserted into a bore 32 of stationary portion 12. Coupler 30 is fixedly secured to rotational portion 14 so as to secure portions 12, 14 to one another in allow free rotation about axis (A), but prevent translational movement of the portions along axis (A). For example, coupler 30 can have screws 34 passed through the coupler and into nuts 36 held by rotational portion 14.

Of course, it is contemplated by the present disclosure for portions 12, 14 to be secured to one another in any desired manner that is sufficient to allow free rotation of the portions with respect to one another about the axis (A), but to prevent translational movement of the portions with respect to one another along the axis (A).

Finally, stationary portion 12 is secured to pole 16. In the illustrated embodiment, stationary portion 12 includes a stationary coupler 38 that receives a rivet or other mechanical fastener (not shown) to secure the stationary portion to pole 16 in a manner that prevents rotation about the axis (A) and prevents translational movement along the axis (A). Of course, it is contemplated by the present disclosure for stationary portion 12 to be secured to pole 16 in any desired manner that is sufficient to prevent rotation about the axis (A) and prevent translational movement along the axis (A) such as, but not limited to, a press fit, an adhesive connection, a welded connection, and any others.

Figure 8:
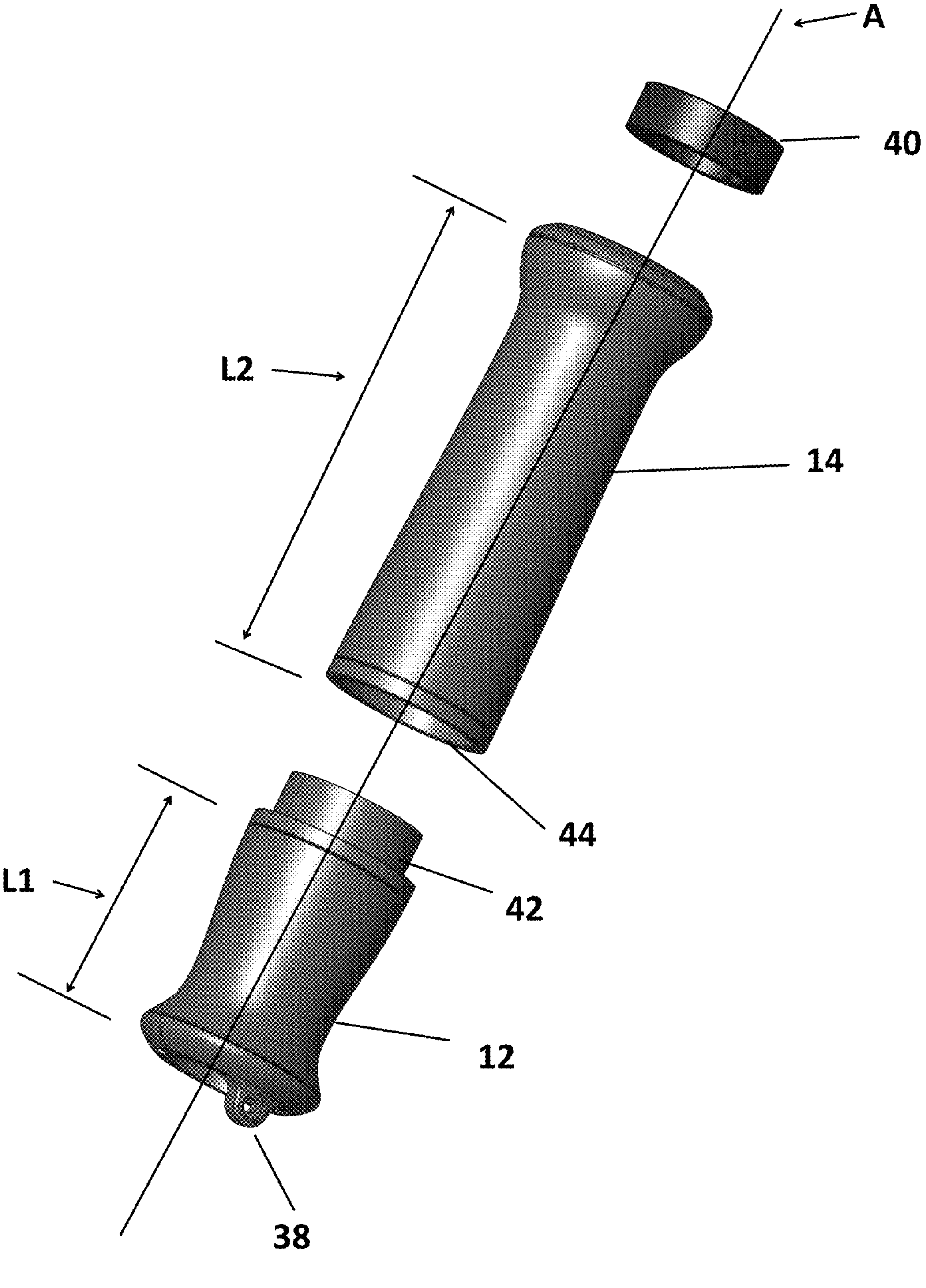
FIG. 8 is a perspective exploded view of the middle handle of FIG. 4.

Middle handle 22 is described in more detail with reference to FIG. 8. Middle handle 22 includes stationary portion 12, rotational portion 14, and a fixing coupler 40. Coupler 40 captures rotational portion 14 between the coupler and stationary portion 12 so as to allow the portions 12, 14 to freely rotate with respect to one another about axis (A), but to prevent translational movement of the portions 12, 14 along the axis (A).

Additionally, stationary portion 12 is secured to pole 16 in a manner that prevents rotation of the stationary portion about the axis (A) and prevents translational movement of the stationary portion along the axis (A). In the illustrated embodiment, stationary portion 12 includes a stationary coupler 38 that receives a rivet or other mechanical fastener (not shown) to secure stationary portion 12 to pole 16. Of course, it is contemplated by the present disclosure for stationary portion 12 to be secured to pole 16 in any desired manner that is sufficient to prevent rotation about the axis (A) and prevent translational movement along the axis (A) such as, but not limited to, a press fit, an adhesive connection, a welded connection, and any others.

Similarly, coupler 40 receives a rivet or other mechanical fastener (not shown) to secure the coupler 40 to pole 16 in a manner that prevents rotation about the axis (A) and prevents translational movement along the axis (A). Of course, it is contemplated by the present disclosure for coupler 40 to be secured to pole 16 in any desired manner that is sufficient to prevent rotation about the axis (A) and prevent translational movement along the axis (A) such as, but not limited to, a press fit, an adhesive connection, a welded connection, and any others. In this manner, rotational portion 14 is freely rotatably between coupler 40 and stationary portion 12 in a desired position on pole 16.

During assembly, stationary portion 12 includes a region 42 that is inserted into a bore 44 of rotational portion 14. Coupler 40 and stationary portion 12 are fixedly secured to pole 16 so as to secure rotational portion 14 between the coupler and the stationary portion.

Advantageously, stationary portion 12 remains in the preset position on pole 16 without rotation about axis (A) or translation along axis (A), while rotational portion 14 remains in the preset position on pole 16 without translational movement along axis (A), but in a manner that allows free rotation about axis (A). Moreover, portions 12, 14 have lengths (L1, L2) that allow either portion to be grasped by the user. It has been determined by the present disclosure that handles 20, 22 allow the user to grip tool 18 in a plurality of combinations not previously possible.

Figure 9:
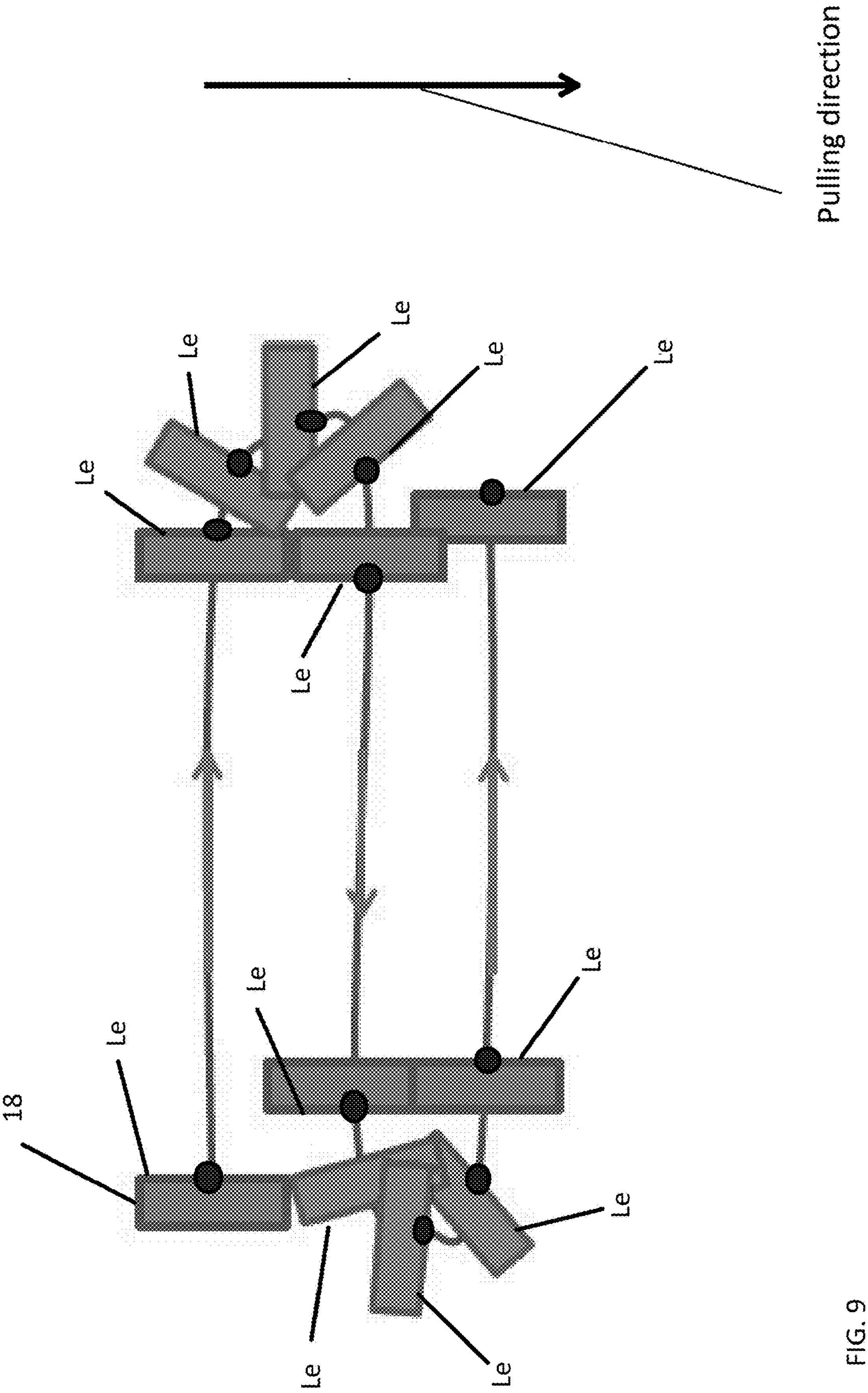
FIG. 9 illustrates an exemplary embodiment of a back-and-forth cleaning path of the tool of FIG. 1.

Handles 10 of the present disclosure find use with pole 16 configured as the bent/offset pole and tool 18 that requires a back-and-forth cleaning path such as in FIG. 1. The back-and-forth cleaning path is shown in FIG. 9, where tool 18 is pulled along a surface being cleaned while the leading edge (Le) of the tool 18 is moved back-and-forth. The back-and-forth motion can be efficient for cleaning large areas. The ease of movement of tool 18, or lack thereof, can be magnified in instances where the total surface area of the surface being cleaned/conditioned is large—either by virtue of there being a single large surface or multiple smaller surfaces. Handles 10 of the present disclosure have been found to reduce fatigue by improving the efficiency of motion by increasing the use of larger muscle groups when cleaning is desired when cleaning/conditioning surfaces by providing more flexibility to meet each user's particular method of inducing the back-and-forth cleaning path.

Specifically, it has surprisingly been found by the present disclosure that different users induce the same back-and-forth cleaning path with such bent/offset poles 16 in very different manners—such that providing handles 20, 22 both with stationary and rotational portions 12, 14 has been found to particularly suited to maximize the gripping options for the users. For example, some users exclusively make use of rotational portion 14 of both handles 20, 22 to induce the back-and-forth cleaning path. Other users primarily make use of stationary portion 12 of middle handle 22 to induce the back-and-forth cleaning path while gripping rotational portion 14 of upper handle 20 so that the upper handle rotates freely. Still other users primarily make use of stationary portion 12 of top handle 20 to induce the back-and-forth cleaning path while gripping rotational portion 14 of middle handle 22 so that the middle handle rotates freely. Still other users make primary use of stationary portions 12 of both top and middle handles 20, 22.

Advantageously, handles 20, 22 allow the end user to determine which combination of stationary/rotational portions 12, 14 to use for each of the handles works best for them to create the desired back-and-forth motion. Further, handles 20, 22 allow the end user to easily adjust the stationary/rotational grip for each of the handles without having to significantly change hand position, which improved ergonomics and reduced fatigue.

Handles 20, 22 are further configured, due to the integration of both stationary and rotational portions 12, 14 into a unitary assembly immediately adjacent one another, so that the user can allow their hand to bridge stationary and rotational portions 12, 14 so that some fingers are on the stationary portion and others are on the rotational portion. In this manner, the user can switch between grasping the stationary portion 12 and the rotational portion 14 by merely adjusting which of their fingers is applying pressure to the handles 20, 22.

Moreover, it has been found by the present disclosure that use of only handles that freely rotate creates issues when utilizing tool 18 in cleaning tasks that do not require the back-and-forth motion—such as in tight spaces (e.g., around table legs, chairs, and the like) and/or during scrubbing tasks. As used herein, scrubbing tasks are intended to define tasks that require the user to apply an additional force along the axis (A) to increase the localized force between tool 18 and the surface being cleaned.

Here, use of stationary portion 12 of both handles 20, 22 provides the user increased control of tool 18, which can be particularly useful in tight spaces and scrubbing tasks. Again, the ease with which the user can switch between grasping stationary portion 12 and rotational portion 14 on each of handles 20, 22 provides increased ease than previously possible.

Although various attributes of assembly are described herein with respect to different embodiments, it is contemplated by the present disclosure for the assembly to include any of the attributes described herein in any desired combination.

It should also be noted that the terms “first”, “second”, “third”, “upper”, “lower”, “front”, “back”, and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated.

What is claimed is:

1. A tool comprising:

a bent pole defining a first axis and a second axis wherein the second axis is offset from the first axis;

a flat mop attached to the bent pole by a universal joint, the universal joint having two different rotational axes, the flat mop having a leading edge;

an agent dispensing system having a reservoir and a rear facing agent dispensing device, the reservoir being configured to contain a cleaning agent, the rear facing agent dispensing device being arranged on the bent pole proximate the flat mop, wherein the reservoir connects to the rear facing agent dispensing device to dispense the cleaning agent;

a first handle arranged at a top of the bent pole along the second axis, the first handle having a first stationary portion defining a bore and a first rotational portion, the first stationary portion and the first rotational portion forming a first assembly with the first stationary portion and the first rotational portion being immediately adjacent one another along the second axis;

a second handle situated closer to the first handle than the flat mop, the second handle having a second stationary portion and a second rotational portion, the second stationary portion and the second rotational portion forming a second assembly with the second stationary portion and the second rotational portion being immediately adjacent one another along the first axis of the bent pole, wherein the second stationary portion is coupled to the bent pole at a region other than the top of the bent pole; and a rotational coupler arranged in the bore of the first stationary portion, wherein the first stationary portion includes a stationary coupler, wherein the stationary coupler is configured to be secured to the bent pole to prevent rotation of the first stationary portion about the second axis of the bent pole and configured to prevent translational movement of the first stationary portion along the second axis of the bent pole, and wherein the first rotational portion is secured to the first stationary portion by the rotational coupler, and wherein the first rotational portion and the rotational coupler are configured to freely rotate with respect to both of the bent pole about the second axis and the first stationary portion and the rotational coupler is configured to prevent the first rotational portion from translational movement with respect to the bent pole and the first stationary portion along the second axis, wherein, in use, the universal joint and the first handle are configured to cause the leading edge of the flat mop to be at a forward position in a direction of cleaning during a back-and-forth cleaning path and the rear facing agent dispensing device is configured to dispense the cleaning agent in front of the leading edge in the direction of cleaning.

2. The tool of claim 1, wherein the first handle is positioned so that the first stationary portion is at the top of the bent pole.

3. The tool of claim 1, wherein the second handle includes a fixing coupler, wherein the fixing coupler is configured to allow the second stationary portion and the second rotational portion to freely rotate with respect to one another about the first axis and to prevent translational movement of the second stationary portion and the second rotational portion along the first axis.

4. The tool of claim 1, wherein the first handle further comprises an activation trigger.

5. The tool of claim 4, wherein the activation trigger is positioned on the first rotational portion.

6. The tool of claim 1, wherein the first stationary portion has a length of between 2-4 inches.

7. The tool of claim 1, wherein the reservoir is attached to the pole.

8. The tool of claim 1, wherein the first rotational portion has a length along the second axis that is between 4-6 inches.

9. The tool of claim 1, wherein the first stationary portion and the first rotational portion have a common outer diameter.

10. The tool of claim 1, wherein the bent pole is a fixed length pole.

11. The tool of claim 1, wherein the first handle further comprises one or more gripping regions, wherein at least one of the one or more gripping regions is positioned and configured to assist in gripping of the first handle.

12. The tool of claim 1, further comprising a cleaning cloth attached to the flat mop.

13. A tool comprising:

a bent pole defining a first axis and a second axis wherein the second axis is offset from the first axis;

a flat mop attached to the bent pole by a universal joint, the universal joint having two different rotational axes, the flat mop having a leading edge;

an agent dispensing system having a reservoir and a rear facing agent dispensing device, the reservoir being configured to contain a cleaning agent, the rear facing agent dispensing device being arranged on the bent pole proximate the flat mop, wherein the reservoir connects to the rear facing agent dispensing device to dispense the cleaning agent;

a first handle arranged at a top of the bent pole along the second axis, the first handle having a first stationary portion and a first rotational portion, the first stationary portion and the first rotational portion forming an assembly with the first stationary portion and the first rotational portion being immediately adjacent one another along the second axis;

a second handle situated closer to the first handle than the flat mop, the second handle having a second stationary portion and a second rotational portion, the second stationary portion and the second rotational portion forming a second assembly with the second stationary portion and the second rotational portion being immediately adjacent one another along the first axis of the bent pole, wherein the second stationary portion is coupled to the bent pole at a region other than the top of the bent pole; and a rotational coupler, wherein the first stationary portion includes a stationary coupler, wherein the stationary coupler is configured to be secured to the bent pole to prevent rotation of the first stationary portion about the second axis of the bent pole and configured to prevent translational movement of the first stationary portion along the second axis of the bent pole, wherein the first rotational portion is secured to the first stationary portion by the rotational coupler, wherein the rotational coupler is mechanically coupled to the first rotational portion such that the first rotational portion is configured to freely rotate with respect to the bent pole about the second axis and with respect to the first stationary portion, and wherein the rotational coupler is configured to prevent the first rotational portion from translational movement with respect to both of the bent pole and the first stationary portion along the second axis, wherein, in use, the universal joint and the first handle are configured to cause the leading edge of the flat mop to be at a forward position in a direction of cleaning during a back-and-forth cleaning path and the rear facing agent dispensing device is configured to dispense the cleaning agent in front of the leading edge in the direction of cleaning.

14. The tool of claim 13, wherein the first handle comprises an activation trigger.

15. The tool of claim 13, further comprising a cleaning cloth attached to the flat mop.

16. The tool of claim 13, further comprising a screw that passes through the rotational coupler and engages with the first rotational portion.

17. The tool of claim 13, wherein the second handle includes a fixing coupler, wherein the fixing coupler is configured to allow the second stationary portion and the second rotational portion to freely rotate with respect to one another about the first axis and to prevent translational movement of the second stationary portion and the second rotational portion along the first axis.

* * * * *